(12) United States Patent
March

(10) Patent No.: US 8,831,927 B2
(45) Date of Patent: Sep. 9, 2014

(54) APPARATUS AND METHOD FOR REDUCING ENERGY USE IN INDUSTRIAL PROCESSES

(75) Inventor: David Allan March, Belmont, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 575 days.

(21) Appl. No.: 13/191,262

(22) Filed: Jul. 26, 2011

(65) Prior Publication Data

US 2013/0030560 A1 Jan. 31, 2013

(51) Int. Cl.
*G06F 17/50* (2006.01)
*G06F 7/62* (2006.01)
*G06F 19/00* (2011.01)

(52) U.S. Cl.
USPC .......... 703/18; 703/13; 703/16; 703/17; 703/19; 700/96; 700/103; 700/104

(58) Field of Classification Search
CPC .............................. G06Q 10/04; G06Q 50/06
USPC ................. 700/95–104; 703/13–20
See application file for complete search history.

(56) References Cited

U.S. PATENT DOCUMENTS

| | | | | |
|---|---|---|---|---|
| 5,369,570 A * | 11/1994 | Parad | ............................ | 705/7.13 |
| 5,377,116 A * | 12/1994 | Wayne et al. | ................. | 700/175 |
| 5,576,965 A * | 11/1996 | Akasaka et al. | ................ | 700/97 |
| 7,301,362 B2 * | 11/2007 | Jang et al. | ......................... | 326/9 |
| 2002/0010563 A1 * | 1/2002 | Ratteree et al. | ..................... | 703/2 |
| 2005/0171625 A1 * | 8/2005 | Denton et al. | ................ | 700/102 |
| 2006/0052890 A1 * | 3/2006 | Selway | .......................... | 700/97 |
| 2006/0277022 A1 * | 12/2006 | Pulfer | ............................. | 703/22 |
| 2011/0184545 A1 * | 7/2011 | Rouge et al. | .................. | 700/103 |

* cited by examiner

*Primary Examiner* — Ramesh Patel
(74) *Attorney, Agent, or Firm* — Boyle Fredrickson, S.C.

(57) ABSTRACT

An energy-saving optimizing program works closely with conventional process simulation programs by applying energy saving paradigms embodied in script files that may review data inherent in the simulation program to identify possible energy-saving opportunities. When the script files identify a possible energy savings, they may interact with the simulation program to evaluate the savings potential and present the same to a user. In this way opportunistic energy savings may be provided even for processes that resist close form global optimization.

20 Claims, 5 Drawing Sheets

APPARATUS AND METHOD FOR REDUCING ENERGY USE IN INDUSTRIAL PROCESSES

BACKGROUND OF THE INVENTION

The present invention relates to computerized analysis of control processes and in particular to a program working with computerized process simulations to identify energy savings.

The manufacture of many products requires the execution of complex processes typically under automated control. Such processes, including diverse processes such as oil refining, paper manufacture, synthesis of pharmaceuticals, electrical energy generation and the like, may be defined by a set of input and output material streams and input and output energy flows into and out of the process. The process may include multiple unit operations each with corresponding material streams and energy flows.

The complexity of many commercially important processes has led to the development of sophisticated simulation tools in which the streams and flows are characterized numerically and the operations on the streams modeled mathematically so that the proper operation of the process may be verified or modified before actual construction or modification. Commercial products for such simulation include, for example, AspenPlus, a process simulation software package commercially available from AspenTech of Burlington, Mass. and a similar product line commercially available from Intelligen Inc. of Scotch Plains N.J. as well as products manufactured by Pavilion Technologies of Austin, Tex.

While complex processes may be accurately simulated, optimization of the process for particular goals, for example, energy savings and cost is not inherent in the ability to simulate the process. Even when a simulation can reveal how a cost and energy savings may change with changes in the defined streams and flows, particularly for complex processes, the ability to simulate the process alone does not necessarily indicate the type or amount of modifications necessary to optimize an arbitrary parameter. For example, an accurate simulation of a process combining two chemicals in chemical reaction may indicate how the resulting product will change with changes in the input streams of the chemicals but will not necessarily suggest, for example, the introduction of an enzyme that may improve the reaction efficiency or how to change input streams to reduce energy usage. Even trial and error changes to one stream or flow to indicate how it changes energy may not reveal the correct setting for the stream or flow for global energy reduction in the process because of the problem of local minima.

Experts in process control can often identify improvements in a process's efficiency on a case-by-case basis, but software tools to assist non-experts in process optimization or to augment the abilities of experts remain elusive because of the complexity of the problem and the case-by-case nature of the solutions.

SUMMARY OF THE INVENTION

The present inventor has recognized that although complex processes often resist optimization by comprehensive automatic procedures, they may nevertheless be improved by applying expert-known patterns of optimization that tend to be applicable to a wide range of processes. The inventor has further recognized that these patterns may be automatically identified based on information generally held in the data tables of process simulation tools. Using existing or supplemental rules on changing process variables in the data of the process simulation tool, the identified patterns may be used to guide changes in the process variables to effect significant improvements in energy usage of a process.

In one embodiment, the patterns of optimization may be divided into the categories of transformative, reflexive, integrative, or cyclic, related generally to the scope of the energy-saving pattern with respect to the process. By sequentially applying the patterns in the order of these categories, increased energy improvement may be obtained.

Specifically then, in one embodiment, the invention provides a method for reducing energy consumption in manufacturing processes comprising the steps of generating a computer simulation of the manufacturing process defining material input and output streams and energy input and output flows and providing computer readable rules associated with the computer simulation defining constraints on changes in at least one of the material input and output streams and energy input and output flows. An optimizing program is executed on electronic computer to apply a series of scripts to data of the material input and output streams to identify at least one predefined pattern of energy savings applicable to the manufacturing process. Based on the identified predefined pattern of energy savings, the computer program provides variations to at least one of the input and output streams and energy input and output flows, as constrained by the computer readable rules, to the computer simulation to provide a simulation output quantifying a change in energy usage.

It is thus one object of at least one embodiment of the invention to provide a software tool for helping identify energy efficiencies in complex processes that are resistant to purely mathematical global optimization.

The manufacturing process may include multiple stages and the scripts may be organized with respect to whether the predetermined pattern of energy savings is transformative, reflexive, integrative, or cyclic, in which transformative patterns of energy savings change proportions of mass or energy used in a stage; reflexive patterns of energy savings change reuse of mass or energy in a stage; integrative patterns of energy savings change reuse of mass or energy between different stages; and cyclic patterns of energy savings change amounts of mass or energy that have been transformed or rejuvenated.

It is thus one object of at least one embodiment of the invention to provide a methodology for identifying patterns of energy savings that may be locally applied.

The method sequentially applies, first, scripts related to transformative patterns of energy savings, second, scripts related to reflexive patterns of energy savings, third, scripts related to integrative patterns of energy savings, and fourth, scripts related to cyclic patterns of energy savings.

It is thus one object of at least one embodiment of the invention to develop an order of applying local energy-saving patterns in a way that will best approximate optimized global energy savings.

The method may provide multiple simulated outputs for different scripts to a user for selection by the user of variations in material input and output streams or energy input and output flows related to a subset of the scripts before repeating step (c) with those variations selected.

It is thus one object of at least one embodiment of the invention to accept user input for improved optimization wherein the user may provide for insight not fully captured by the data of the simulation program.

The defined material input and output streams may include material identifications and characterizations of a role of the identified materials and the scripts may identify applicable patterns of energy savings based on material identifications and characterizations of the role of the materials. For example, the role of the materials may include materials identified as components of an end product and materials identified as incidental to the end product. More specifically, for example, some materials may be identified as raw materials and some identified as solvents.

It is thus one object of at least one embodiment of the invention to provide a method of identifying patterns for energy savings by automatic or semiautomatic review of the data in a pre-existing process simulation.

It is thus one object of at least one embodiment of the invention to

At least one predefined pattern of energy savings may be selected from the group consisting of dilution reduction, catalyst introduction, heat recovery, membrane separation, and material reuse; material transformation.

It is thus one object of at least one embodiment of the invention to provide compact and easily understood patterns of energy savings that may be reviewed and accepted by the user The method may further include the step of providing a simulation output quantifying a change in cost.

It is thus an object of at least one embodiment of the invention to constrain energy savings optimization to situations having economic reality.

These particular features and advantages may apply to only some embodiments falling within the claims and thus do not define the scope of the invention.

DETAILED DESCRIPTION OF THE PREFERRED EMBODIMENT

Figure 1:
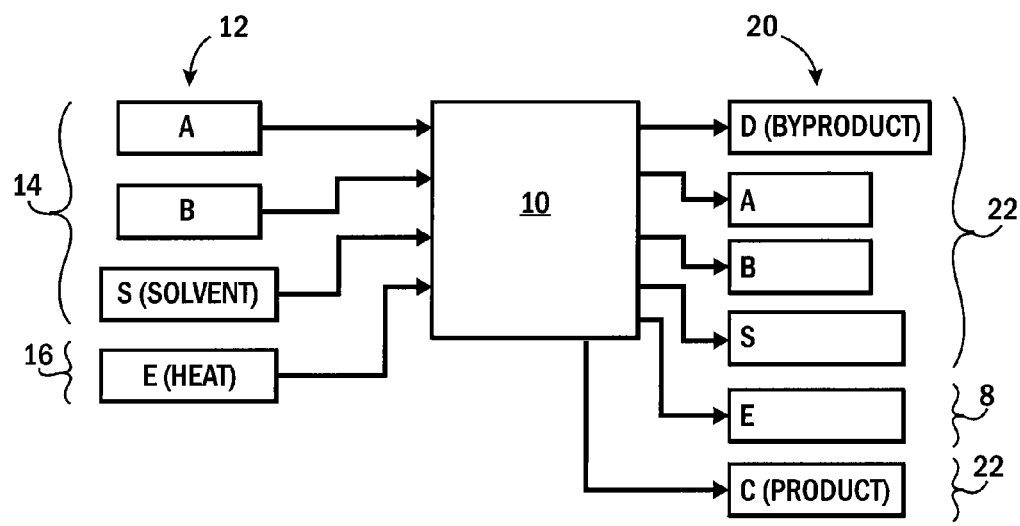
FIG. 1 is a simplified diagram of a unit operation (possibly a portion of a multi-step process) that may be optimized by the present invention, showing input and output material streams and energy flows.

Referring now to FIG. 1, an example unit operation 10 of an industrial process may receive inputs 12 comprised of input materials 14 being, for example, feedstock chemicals A and B that will be consumed in the unit operation 10 and a solvent S serving as an intermediary material. The unit operation 10 may also receive input energy 16 typically in the form of heat, for example, for an endothermic reaction.

Likewise, the unit operation 10 may produce outputs 20, comprised of output materials 22 including: by-product D, unused feedstock chemicals A and B, solvent S and the desired product C. Output energy 18, typically in the form of waste heat, is also generated.

Figure 2:
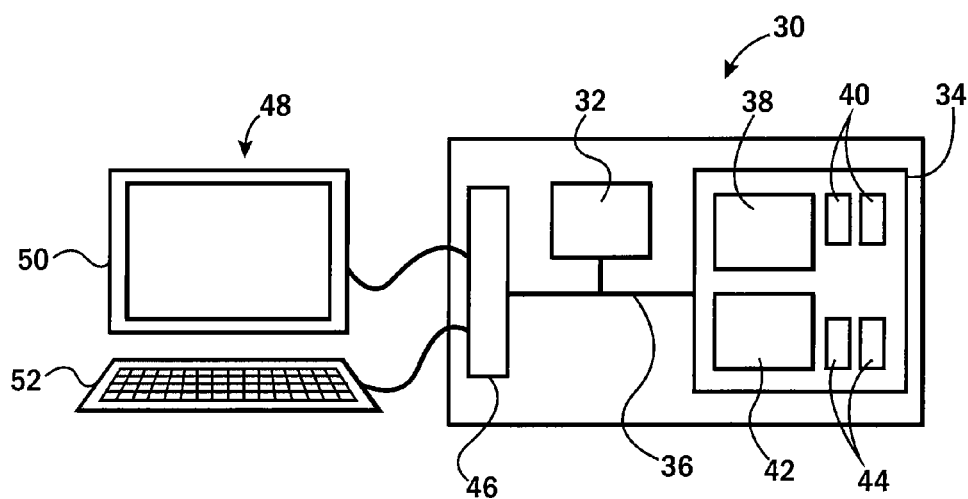
FIG. 2 is a block diagram of an electronic computer suitable for execution of an optimizing program implementing the present invention and a simulation program from the prior art.

Referring to FIG. 2, a process including the unit operation 10 may be simulated on a computer system 30 including a processor 32 communicating with the memory 34, for example, via a bus structure 36. The memory 34 may hold a simulation program 38 of the type generally known in the art (and cited above) having associated data files 40 as will be described below. The memory 34 may also hold an optimizing program 42 of the present invention together with its associated data files 44.

The bus structure 36 of the computer system 30 may also allow the processor 32 to communicate with an interface 46 for communicating with human machine interface elements 48 including, for example, a computer monitor 50 and input device 52 providing input and output to a human operator.

It will be understood that the computer system 30 may be realized in the components of an industrial control system having, for example, interconnected components of a power supply, controller, I/O modules, and network interface cards, as modules that plug into a common high speed backplane in a rack structure. Such industrial controller are known in the art and include devices manufactured by Rockwell Automation, Inc. for example under the Logix tradename. In this case, either or both of the simulation program 38 and optimizing program 42 of the present invention together with the associated data files may be held and executed by the controller module or another specialized module.

Figure 3:
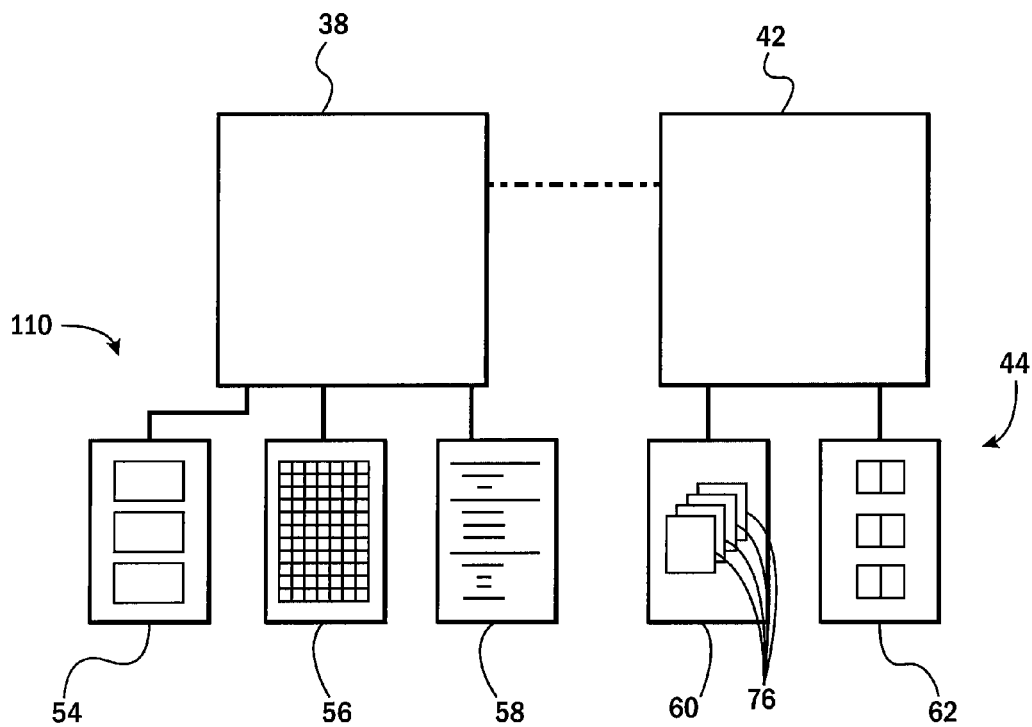
FIG. 3 is a representation of an optimizing and simulation program held in the computer of FIG. 2 and their related data structures for implementing the present invention.

Referring now to FIG. 3, the data files 40 of the simulation program 38 will generally include a set of models 54 describing physical processes that may be implemented by the unit operation 10, for example, functions describing the operation chemical reactions, thermodynamic processes, and mechanical actions in processing of the inputs 12 to manufacture the outputs 20. The models 54 may work closely in conjunction with a stream table 56 describing the above described inputs 12 and outputs 20 together with their initial states, time rates (e.g. flow), costs, etc. The stream table 56 also inferentially describes the interaction of materials and energy in the unit operation 10 through description of streams combining other streams.

Generally, the stream table 56 will hold information entered by the user for the purpose of process simulation, the user having knowledge of the unit operation 10. The stream table 56 will thus capture process data related to a desired operating point for the process which may or may not be optimized for a particular parameter such as energy. The data files 40 may also include a rules table 58 describing rules with respect to the possible changes in the data of the stream table 56. For example, the rules table 58 may describe ranges of purity or temperature required of materials of the streams or the possible substitution of different materials for materials of the streams. In cases where the simulation program 38 does not explicitly provide for rules table 58, a comments field of the stream table 56 may be used. Generally the rules of the rules table 58 will be written in a script that may be interpreted by the optimizing program 42.

Referring still to FIG. 3, the optimizing program 42 may communicate with the simulation program 38 by reading the rules table 58 reading and writing to the stream table 56 (either directly or through the agency of the simulation program 38) and invoking commands to cause simulations in various experimental scenarios using the simulation program 38.

The data files 44 of the optimizing program 42 may include a script file 60 holding energy-saving pattern scripts 76 describing common energy-saving paradigms (as will be discussed below) and scenario file 62 recording changes in the stream table 56 for various simulations that may be run on the simulation program 38 by the optimizing program 42.

Figure 4:
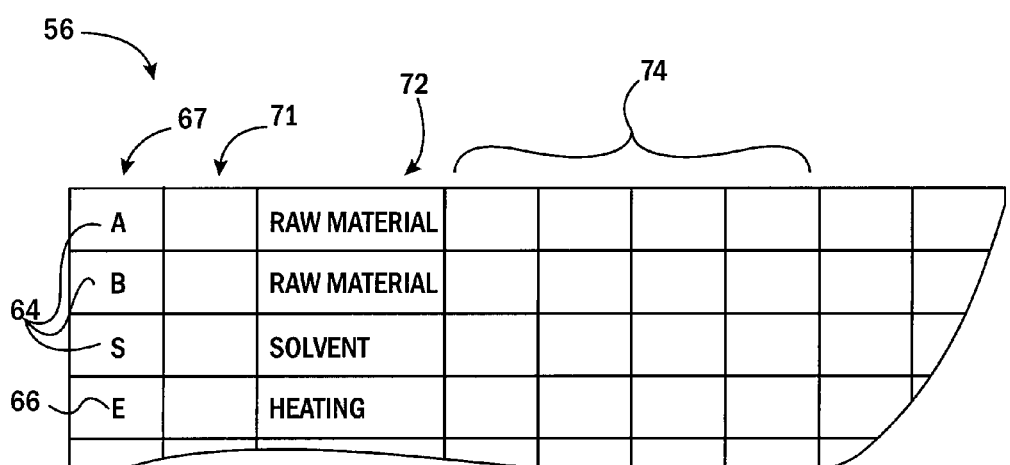
FIG. 4 is a simplified representation of the data table of FIG. 3 used to hold process variables for a the simulation program.

Referring now to FIG. 4, the stream table 56 may generally define a series of material streams 64 and energy flows 66 in different rows of the stream table 56. Each stream or flow may be given an identifier 67 and a full description 71. In the case of material streams 64 the description 71 may include, for example, chemical composition purity and the like. The role of stream or flow is also given a role description 72 deriving from the purpose of the material of the stream or flow in the unit operation 10. Thus, for example, a material such as ethanol could have the role of "raw material" when used in a chemical reaction to produce a product or the role of a "solvent" when used for holding reactants that produce the product, depending on its intended use. Likewise energy, for example, electrical energy, could have a role of "electroplating" or "heating", a distinction which will be important with respect possible substitutions of other energy sources. Other additional information 74 related to the streams may be provided including flow rate, initial temperature, price, molecular weight, viscosity, density and the like. The particular information will vary according to the simulation program 38.

Figure 5:
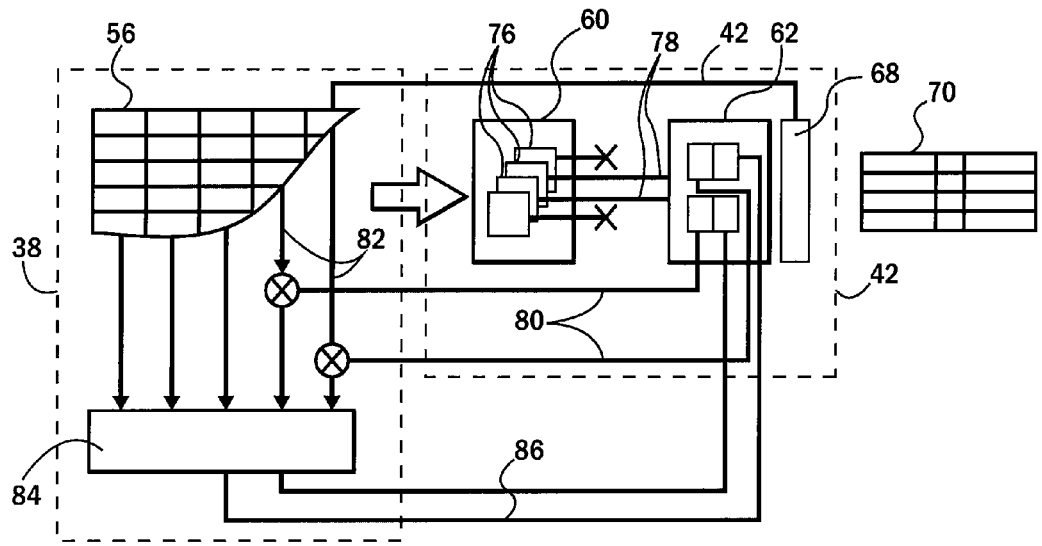
FIG. 5 is a data flow diagram showing application of savings-pattern scripts of the present invention on the data table of FIG. 4 to identify and propose patterns of energy savings and to modify the process variables of the data table to provide comparative energy savings data.

Referring now to FIG. 5, the optimizing program 42 may sequentially execute a series of savings-pattern scripts 76 held in the script file 60, each savings-pattern scripts 76 embodying an empirically derived paradigm for energy savings, for example, changing dilution ratios to reduce solvent costs in heat and material. Each savings-pattern script 76, when executed, causes the optimizing program 42 to scan through the stream table 56 to identify streams and their relationships that match the paradigm of the energy savings. Thus, for example, if the script 76 relates to changing dilution ratios, the script 76 will look for streams in the stream table 56 related to solvents and their solutes.

The savings-pattern scripts 76 will generally be prepared on an ad hoc basis and will not include every possible optimization of all possible processes. Using savings-pattern scripts 76 avoids the problems of attempting to construct a global optimization process that requires consideration of every process variable.

When each savings-pattern script 76 has been scanned, only a subset 78 of scripts 76 will be identified as applicable to the unit operation 10.

Each of the selected subset 78 of savings-pattern scripts 76 will then generate a new set of input stream data 80 that will be substituted for existing stream data 82 from the stream table 56 and applied to a simulation engine 84, being part of the simulation program 38, to produce new output stream values 86. The new set of input stream data 80 and new output stream values 86 will be stored in the scenario file 62 for later consideration by the user. Thus, for example, if the savings-pattern scripts 76 relates to changing dilution values, new dilution values that may form a new set of input stream data 82 to be substituted for the existing stream data 82 will be run on the simulation program 38, and the new output stream value provided by that simulation stored in the scenario file 62.

The data of the scenario file 62 may be provided to an output formatter 68 that may also review the stream table 56 to collect additional data used to prepare an output table 70 displaying data from the scenario file 62 together with a column indicating changes in energy or dollars caused by application of the different savings-pattern scripts 76 and thus the relative improvements in the unit operation 10 attributable to each savings-pattern scripts 76.

Figure 6:
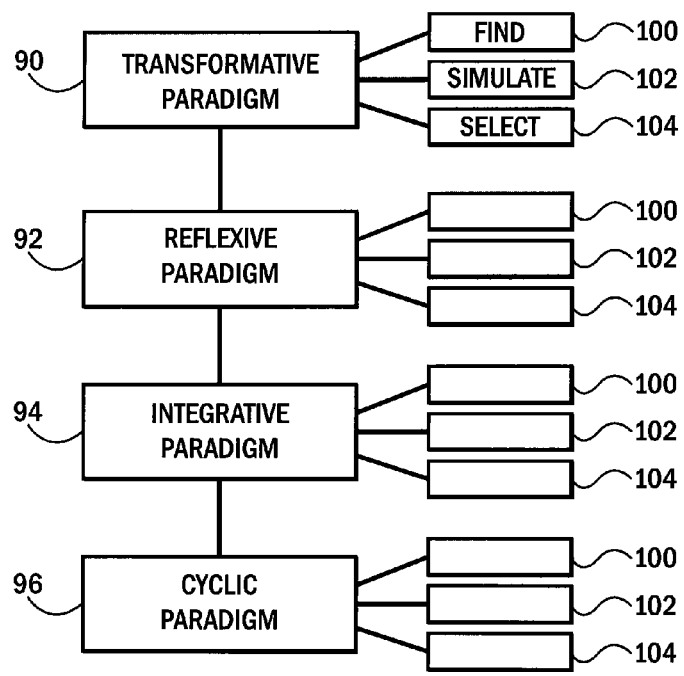
FIG. 6 is a hierarchical diagram showing grouping of the savings-pattern scripts of FIG. 5 into categories of transformative, reflexive, integrative, or cyclic for sequential consideration.

Referring now to FIG. 6, each of the savings-pattern scripts 76 may be classified according to the scope of its changes to the unit operation 10 and the associated operations that comprise the process. A first categorization is that of transformative paradigms 90. Generally transformative paradigms for energy savings change proportions of mass or energy used in a single given unit operation of the process. A second categorization is that of reflexive paradigms 92. Generally, reflexive paradigms of energy savings change reuse of mass or energy in a single given unit operation 10. A third categorization is that of integrative paradigms 94. Integrative paradigms of energy savings change reuse of mass or energy between different unit operations 10, being part of a larger process. Finally, a fourth categorization is that of cyclic paradigms 96. Cyclic paradigms of energy savings change amounts of mass or energy that have been transformed or rejuvenated in some manner.

The optimizing program 42, in applying the savings-pattern scripts 76, applies them in this order of: (1) transformative, (2) reflexive, (3) integrative, and (4) cyclic repeating the steps of reviewing the stream table 56 to find potential energy-saving paradigms that match savings-pattern scripts 76 for that category as indicated by process block 100 and then for those applicable savings-pattern scripts 76, simulating an alternative scenario for improved energy usage as indicated by process block 102, and finally, allowing the user or automated program to select among proposed energy-saving paradigms as indicated by process block 104.

Only after all of the savings-pattern scripts 76 of a single grouping (e.g. transitive, reflexive, integrative, and cyclic) have been applied, per process box 100-104, are the steps repeated for the next grouping. By dividing the savings-pattern scripts 76 thusly and applying them sequentially, problems of conflicting savings-pattern scripts 76 are reduced, for example, where one paradigm undoes the benefits of other paradigms or blocks the use of superior paradigms.

Figure 7:
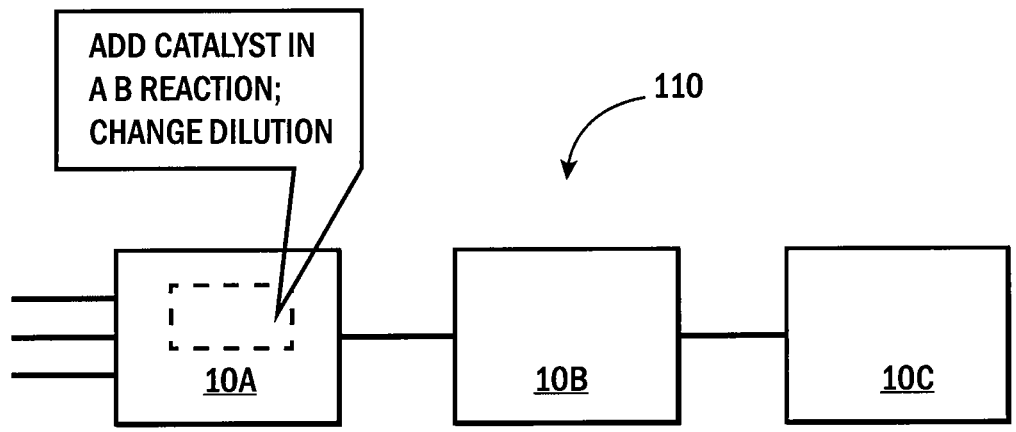
FIG. 7 is a diagram showing the process of FIG. 1 in the context of a larger process with an example transformative change.
Figure 8:
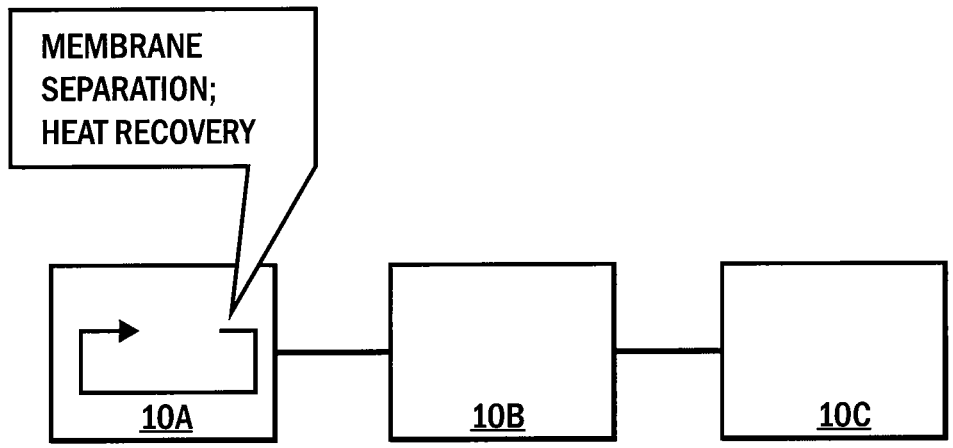
FIG. 8 is a figure similar to that of FIG. 7 showing example reflexive changes.
Figure 9:
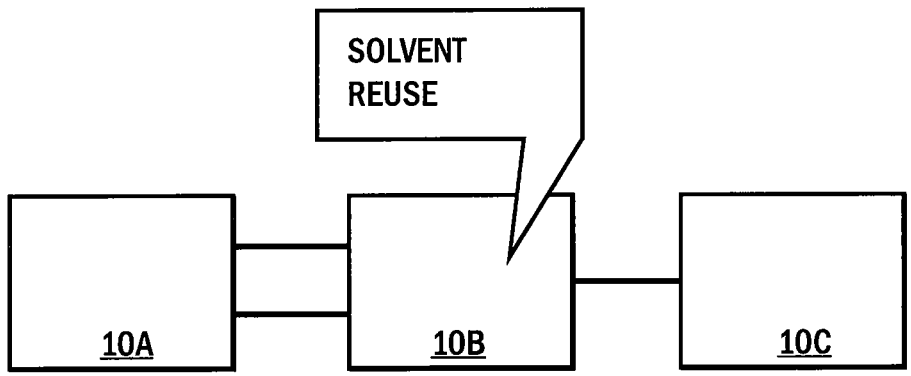
FIG. 9 is a figure similar to FIGS. 7 and 8 showing example integrative changes.
Figure 10:
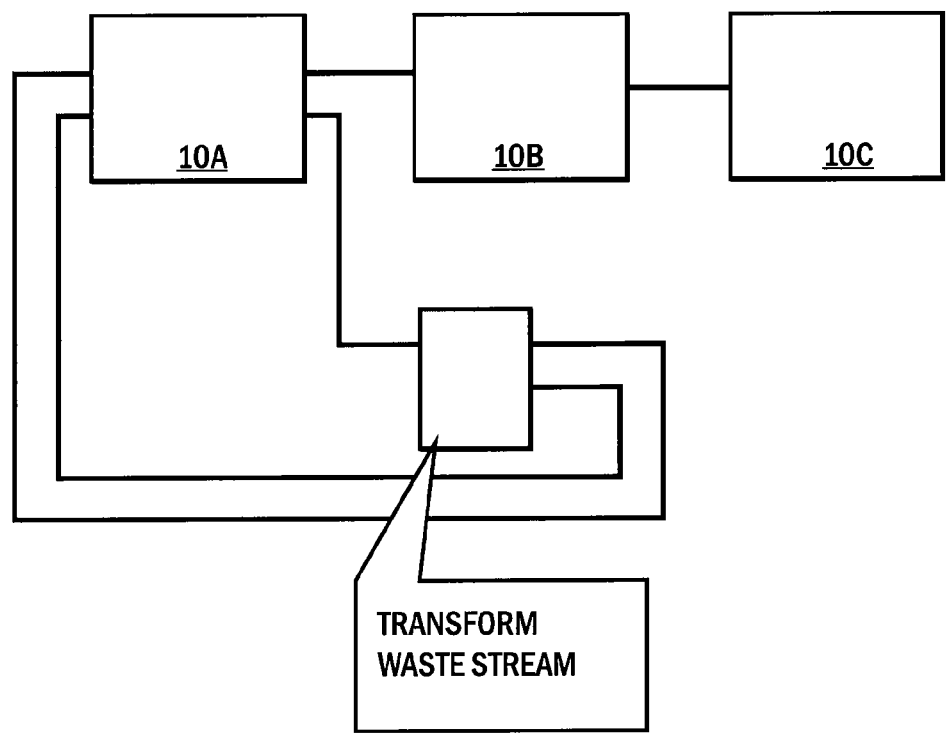
FIG. 10 is a figure similar to FIGS. 7-9 showing example cyclic changes.

Referring now to FIGS. 1 and 7, an example of this process may be illustrated in an industrial process 110 comprised of three unit processes 10a-10c including unit operation 10a (described above) which combines chemicals A and B in order to react to produce compound C. The reaction takes place in a solvent S, and reaction of A and B to produce C is endothermic, which means that heat in the form of energy input E must be input for the reaction to occur. The reaction is not 100% efficient, so there is some residual A and B left in solution. Also, an unwanted byproduct D is produced.

The stream table 56 of the process simulation program 38 for the unit operation 10a, as simplified, may be represented by the following Table I:

TABLE I

| Item | Input | Output |
|------|-------|--------|
| A | 100 | 8 |
| B | 100 | 8 |
| C | 0 | 160 |
| D | 0 | 24 |
| S | 1000 | 1000 |
| E | 100 | 92 |

Using this and other data in the stream table 56 the output formatter 68 may calculate the mass and energy efficiency and overall process efficiency (OPE).

$$\text{Mass Efficiency:} \ \frac{\text{Mass of } C}{\text{Mass of } A + B + C} = \frac{160}{100 + 100 + 1000} = 13\%$$

$$\text{Energy Efficiency:} \ \frac{\text{Change in Gibbs Free Energy of } C}{\text{Total Input Energy}} = \frac{3}{10} = 3\%$$

$$\text{Overall Process Efficiency: Mass Efficiency} \times \text{Energy Efficiency} =$$

$$13\% \times 3\% = 0.39\%$$

In this example, the savings-pattern scripts 76 identified two possible paths of improved energy efficiency: adding a catalyst to react products A and B and changing the dilution of the products A and B in solvent S. The script provides a simple hill climb optimization for each of these energy-saving paradigms based on the identified materials of the stream tables as described above. The hill climb is effected by trying different inputs and running the simulation to provide different outputs. The output formatter 68 then analyzes the mass balance from the stream tables to recalculate the energy efficiency. The models have estimates of the cost of implements these methods, so an automated ROI calculation can be made.

A simplified output table 70 from the output formatter 68 thus has the following form:

TABLE II

| Item | Original Input | Original Output | Paradigm | Revised Input | Revised Output | Est. Energy Savings ROI |
|------|---------|---------|----------|---------|---------|---------|
| A | 100 | 8 | Enzyme Catalysis | 100 | 1 | −5% |
| B | 100 | 8 | Enzyme Catalysis | 100 | 1 | −5% |
| C | 0 | 160 | Enzyme Catalysis | 0 | 180 | −5% |
| D | 0 | 24 | Enzyme Catalysis | 0 | 4 | −5% |
| S | 1000 | 1000 | Dilution Reduction | 800 | 800 | 300% |
| E | 100 | 92 | Dilution Reduction | 80 | 73 | 200% |

Figure 11:
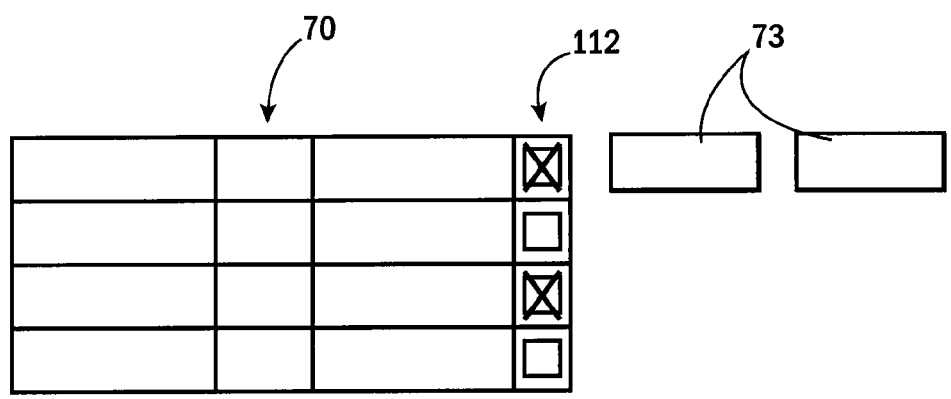
FIG. 11 is a simplified screen diagram showing a mechanism by which a user may select proposed optimizations from the present invention in between each group of changes per the hierarchy of FIG. 6 and the display of absolute or differential energy and dollar costs.

Referring now momentarily to FIG. 11, the output table 70 may include voting buttons 112 allowing the user to select which particular ones (or all) of these paradigms to implement. In this case, the user would likely select the dilution reduction and not the enzyme catalysts, as the latter produces a negative return on investment (for example as may it result from a high expense of the catalyst and its relative low effectiveness). Generally, by decreasing the dilution of the materials A and B in solvent S, solvent is saved as well as the cost of heating the solvent. This is largely a rule of thumb improvement that has been embodied in a savings-pattern script 76. In addition, the output table 70 may be associated with a display 73 indicating cumulative energy savings, cost savings or return on investment. In this respect, the present program may also be used to optimize costs that are separate from energy, for example savings in material costs which may be aggregated with energy savings costs or treated individually.

Alternatively the particular paradigms to implement may be selected automatically based on ROI.

Once the transformative savings are calculated and selected, they are assumed as a starting condition for the application of the reflexive paradigms. As noted above, reflexive savings will be those that reuse a waste stream from the unit operation 10 back into the unit operation 10. For batch operations, this means reusing something from the prior batch into the current batch.

In this case, the savings-pattern scripts 76 may identify the possibility of membrane separation of output streams A and B for reuse and solvent reuse (where output solvent S is returned for use as input solvent S), and heat recovery from the solvent. Solvent reuse is blocked by the rules of the rules table 58 indicating a particular purity of solvent is required or information characterizing the solvent in the stream table 56 or by the user manually vetoing by the operator as indicated in the following Table III:

TABLE III

| Item | Original Input | Original Output | Model | Revised Input | Revised Output | Est. Energy Savings ROI |
|------|---------|---------|-------|---------|---------|---------|
| A | 100 | 8 | Membrane Separation | 94 | 6 | 30% |
| B | 100 | 8 | Membrane Separation | 94 | 6 | 30% |
| C | 0 | 160 | No Action | 0 | 160 | NA |
| D | 0 | 24 | No Action | 0 | 24 | NA |
| S | 800 | 800 | No Action, Solvent Contaminated. | 800 | 800 | NA |
| E | 80 | 73 | Heat Recovery from Solvent | 10 | 65 | 200% |

Again, the user may select particular paradigms to proceed with. The optimizing program 42 then considers the savings-pattern scripts 76 associated with integrative savings. These savings-pattern scripts 76 may compare the waste streams with resource input requirements of other unit operations in the process. In this case, the savings-pattern scripts 76 may identify the reuse of solvent in later unit operations 10b-c and additional energy reuse; however the latter is precluded by the earlier application of the reflexive savings. Generally, the ordering of the application of the savings-pattern scripts 76 according to FIG. 6 is believed to ensure that this blockage between the applications of different paradigms only occurs when a superior paradigm blocks and inferior paradigm from the point of view of global energy reduction.

At the conclusion of the application of the integrative paradigms, the following output table 70 may be produced per Table IV:

TABLE IV

| Item | Original Input | Original Output | Model | Revised Input | Revised Output | Est. energy savings ROI |
|---|---|---|---|---|---|---|
| A | 94 | 6 | No Action | 94 | 6 | NA |
| B | 94 | 6 | No Action | 94 | 6 | NA |
| C | 0 | 160 | No Action | 0 | 160 | NA |
| D | 0 | 24 | No Action. No other process can utilize D | 0 | 24 | NA |
| S | 800 | 800 | Reuse solvent in other process | 800 | 800 now categorized as product not waste | 400% |
| E | 10 | 65 | No Action. Heat already recovered | 10 | 65 | NA |

Note that by reusing the solvent, the solvent is characterized differently thus affecting the energy savings ROI computed by the output formatter 68.

The optimizing program 42 analyzes the stream table 56 and determined that the waste solvent could be used in another unit operation where the contamination of the solvent by D is not of a concern according to the rule table 58, so the solvent is not wasted any longer in the unit operation 10*a*, but represents a product, so it is re-categorized. At this point in the process there is no reuse for byproduct D.

The optimizing program 42 then proceeds to the final step of cyclic savings-pattern scripts 76. In this case, two savings-pattern scripts 76 identify the ability to sell product D (thus re-characterizing it) or separate and reverse react D to create source materials A and B. The following final output table 70 is generated as Table V:

TABLE V

| Item | Original Input | Original Output | Model | Revised Input | Revised Output | Est. Energy Savings ROI |
|---|---|---|---|---|---|---|
| A | 94 | 6 | No Action | 94 | 6 | NA |
| B | 94 | 6 | No Action | 94 | 6 | NA |
| C | 0 | 160 | No Action | 0 | 160 | NA |
| D | 0 | 24 | Membrane Separation and Sell | 0 | 24: Now categorized as product | −20% |
| D | 0 | 24 | Membrane Separate reverse reaction creating A & B | 0 | 6. Incomplete reversal. 9A and 9B recovered | 35% |
| S | 800 | 800 | No Action | 800 | 800 now categorized as product not waste | NA |
| E | 10 | 65 | No Action. | 10 | 65 | NA |

This now completes the application of the savings-pattern scripts 76 and the output formatter 68 may again compute various energy efficiencies to compare the new Overall Process Efficiency with the beginning process.

$$\text{Mass Efficiency} \frac{C+S}{A+B+S} =$$

$$\frac{160+800}{85^* + 85^* + 800} = 98.9\% \text{ (as compared to 13\%)}$$

The 85 represents the input now required after recovering unused material and reversing D to yield A and B.

$$\text{Energy Efficiency} \frac{\text{Change in Gibbs Free Energy of } C}{\text{Total Input Energy}} =$$

$$\frac{3}{10^*} = 30\% \text{(compared to 3\%)}$$

This energy input reflects a steady state situation. There will be an additional loss of 80 over the entire run. This is the amount of energy required to do the first batch. It will not be recovered on the last batch. If 10 batches are planned, then allocating this loss over the 10 batches increases the average input energy to 18, reflecting a Energy Efficiency of 17% which will be used in the final OPE calculation.

Overall Process Efficiency=Mass Efficiency×Energy Efficiency=98.9%×17%=16.8% (as compared to 0.39%)

In this simplified example, the optimizing program 42 improves the efficiency of this unit operation by 16.8/0.39=43 times.

The above description begins with an arbitrary operational unit 10 and proceeds generally in a direction of evident material flow, however, such an ordering is not always implicit in a complex process or desirable for optimization. In complex processes that involve multiple interrelated process steps, additional attention may be given to the problem of identifying the sequence in which unit operations are analyzed for savings, because changing a mass or energy balance in one unit operation may have effects on linked processes.

In an additional embodiment of the invention, a sequence of optimization may be adopted by analyzing energy usage of each of the operational units 10 according to the following categories:

Direct Energy

This is the energy directly required to perform the chemical or biological transformation of the unit operation 10. This is typically described as the change in the Gibbs Free Energy of the reaction, or in the case of biological systems, the metabolic balance. It is specific to the reaction.

Indirect Energy

This is the energy that is required to facilitate the reaction but is not directly involved in the reaction. It can be thought of as amount of energy required to transfer the direct energy to the reaction. For example, one must heat all of the solvent in an endothermic reaction in order to transfer the requisite direct energy to the reacting species. The heating of the solvent is indirect energy because it just facilitates the reaction but does not participate in the reaction.

Environmental Energy.

Associated with containment, control and regulation. It is the energy of the surroundings, for example lighting, air conditioning, etc.

In optimizing a process comprised of multiple unit operations 10 the energy flows 66 may be characterized manually or automatically (in the latter case by a script system similar to scripts 76 described above), and the OPE calculated for each unit operation 10. The optimization may start with the unit operation 10 having the lowest energy efficiency. In the case of a tie, the unit operation 10 with the worst Mass Efficiency takes precedent. This is because mass efficiency typically provides increased savings, since it reduces both energy usage and material consumption.

Next, when performing the analysis process described above with respect to transformative, reflexive, integrative, and cyclic paradigms, these optimizations are applied with respect to energy savings in the following sequence.

Indirect Energy
Environmental Energy
Direct Energy.

Thus, the energy-saving paradigms are applied first to Indirect Energy. This is because Direct Energy processes are determined by the reaction itself, which one cannot change. Environmental Energy is analyzed after Indirect Energy because Environmental Energy is a function of Indirect Energy. For example, if one can reduce the amount of solvent, then one doesn't need as large a vessel, floor space and hence heating and air conditioning and the like.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

The term script refers simply to a short computer program that can be executed by another computer program and is not intended to suggest or imply an interpreted language or program that coordinates different application programs.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

I claim:

1. A method for reducing energy consumption in manufacturing processes executable on an electronic computer according to a program stored in a non-transitory medium comprising the steps of:
   (a) generating a computer simulation of the manufacturing process defining material input and output streams and energy input and output flows;
   (b) providing computer readable rules associated with the computer simulation defining constraints on changes in at least one of the material input and output streams and energy input and output flows;
   (c) applying a series of scripts to data of the material input and output streams to identify at least one predefined pattern of energy savings applicable to the manufacturing process; and
   (d) based on the identified predefined pattern of energy savings, providing variations to at least one of the input and output streams and energy input and output flows, constrained within the computer readable rules, to the computer simulation to provide a simulation output quantifying a change in energy usage.

2. The method of claim 1 wherein the manufacturing process includes multiple stages and wherein the scripts are organized with respect to whether the predetermined pattern of energy savings is transformative, reflexive, integrative, or cyclic in which transformative patterns of energy savings change proportions of mass or energy used in a stage; reflexive patterns of energy savings change reuse of mass or energy in a stage; integrative patterns of energy savings change reuse of mass or energy between different stages; and cyclic patterns of energy savings change amounts of mass or energy that have been transformed or rejuvenated.

3. The method of claim 2 wherein the method performs the steps (c) and (d) repeatedly first for scripts related to transformative patterns of energy savings, second for scripts related to reflexive patterns of energy savings, third for scripts related to integrative patterns of energy savings, and fourth for scripts related to cyclic patterns of energy savings.

4. The method of claim 3 wherein step (d) provides multiple simulated outputs for different scripts to a user for selection by the user of variations in material input and output streams or energy input and output flows related to a subset of the scripts before repeating step (c) with those variations selected.

5. The method of claim 1 wherein the defined material input and output streams include material identifications and characterizations of a role of the identified materials and wherein the scripts identify applicable patterns of energy savings based on material identifications and characterizations of the role of the materials.

6. The method of claim 5 wherein the role of the materials includes materials identified as components of an end product and materials identified as incidental to the end product.

7. The method of claim 6 wherein at least some materials are identified as raw materials and some identified as solvents.

8. The method of claim 1 wherein at least one predefined pattern of energy savings is selected from the group consisting of dilution reduction, catalyst introduction, heat recovery, membrane separation, material reuse, and material transformation.

9. The method of claim 1 wherein the method further includes the step of (e) providing a simulation output quantifying a change in cost.

10. An electronic computer executing a program stored in a non-transitory medium on the electronic computer to operate with a computer simulation of a manufacturing process defining material input and output streams and energy input and output flows and providing computer readable rules associated with the computer simulation defining constraints on changes in at least one of the material input and output streams and energy input and output flows, the electronic computer executing the steps of:
 (a) applying a series of scripts to data of the material input and output streams to identify at least one predefined pattern of energy savings applicable to the manufacturing process; and
 (b) based on the identified predefined pattern of energy savings, providing variations to at least one of the input and output streams and energy input and output flows, the variations being within the computer readable rules, to the computer simulation to provide a simulation output quantifying a change in energy usage.

11. The electronic computer of claim 10 wherein the manufacturing process includes multiple stages and wherein the scripts are organized with respect to whether the predetermined pattern of energy savings is transformative, reflexive, integrative, or cyclic in which transformative patterns of energy savings change proportions of mass or energy used in a stage; reflexive patterns of energy savings change reuse of mass or energy in a stage; integrative patterns of energy savings change reuse of mass or energy between different stages and cyclic patterns of energy savings change amounts of mass or energy that have been transformed or rejuvenated.

12. The electronic computer of claim 11 wherein the computer program performs the steps (a) and (b) repeatedly first for scripts related to transformative patterns of energy savings, second for scripts related to reflexive patterns of energy savings, third for scripts related to integrative patterns of energy savings, and fourth for scripts related to cyclic patterns of energy savings.

13. The electronic computer of claim 12 wherein step (b) provides multiple simulated outputs for different scripts to a user for selection by the user of variations in material input and output streams or energy input and output flows related to a subset of the scripts before repeating step (a) with those variations selected.

14. The electronic computer of claim 10 wherein the defined material input and output streams include material identifications and characterizations of a role of the materials, and wherein the scripts identify applicable patterns of energy savings based on material identifications and characterizations of the role of the materials.

15. The electronic computer of claim 14 wherein the role of the materials includes materials identified as components to an end product and materials identified as incidental to the end product.

16. The electronic computer of claim 15 wherein at least some materials are identified as raw materials and some identified as solvents.

17. The electronic computer of claim 10 wherein at least one predefined pattern of energy savings is selected from the group consisting of dilution reduction, catalyst introduction, heat recovery, membrane separation, and material reuse.

18. The electronic computer of claim 10 wherein the computer program further includes the step of (e) providing a simulation output quantifying a change in cost.

19. A system for reducing energy consumption in manufacturing processes executable on an electronic computer according to a program stored in a non-transitory medium to implement:
 (a) a first data structure providing a simulation program of the manufacturing process defining material input and output streams and energy input and output flows;
 (b) rules engine associated with the computer simulation defining constraints on changes in at least one of the material input and output streams and energy input and output flows; and
 (c) a second data structure providing a series of scripts;
 wherein applying the scripts to data of the material input and output streams identifies at least one predefined pattern of energy savings applicable to the manufacturing process; and
 wherein, based on the identified predefined pattern of energy savings, variations to at least one of the input and output streams and energy input and output flows, constrained within the rules, to the simulation program to provide a simulation output quantifying a change in energy usage.

20. The system of claim 1 wherein the manufacturing process includes multiple stages and wherein the scripts are organized with respect to whether the predetermined pattern of energy savings is transformative, reflexive, integrative, or cyclic in which transformative patterns of energy savings change proportions of mass or energy used in a stage; reflexive patterns of energy savings change reuse of mass or energy in a stage; integrative patterns of energy savings change reuse of mass or energy between different stages; and cyclic patterns of energy savings change amounts of mass or energy that have been transformed or rejuvenated.

* * * * *